United States Patent [19] [11] 3,895,855
Nagel [45] July 22, 1975

[54] END-VIEWABLE, SPOKE-MOUNTABLE REFLECTOR

[75] Inventor: Robert L. Nagel, Skokie, Ill.
[73] Assignee: Beatrice Foods Company, Elgin, Ill.
[22] Filed: Dec. 26, 1973
[21] Appl. No.: 427,990

[52] U.S. Cl. .................... 350/99; 350/97; 350/103
[51] Int. Cl.² .......................................... G02B 5/12
[58] Field of Search ........................ 350/97–109, 350/288, 299; 280/150 A

[56] References Cited
UNITED STATES PATENTS

| 2,344,542 | 3/1944 | Fike | 350/99 |
| 3,007,743 | 11/1961 | Lange | 350/99 |
| 3,528,721 | 9/1970 | La Londe | 350/99 |
| 3,541,606 | 11/1970 | Heenan et al. | 350/103 |
| 3,684,347 | 8/1972 | Challe | 350/97 |
| 3,781,082 | 12/1973 | Linder | 350/99 |

FOREIGN PATENTS OR APPLICATIONS

| 795,644 | 5/1958 | United Kingdom | 350/99 |

Primary Examiner—Alfred E. Smith
Assistant Examiner—Michael J. Tokar
Attorney, Agent, or Firm—Hill, Gross, Simpson, Van Santen, Steadman, Chiara & Simpson

[57] ABSTRACT

A wheel member having secured thereto an end viewable reflector means for use on a vehicle such as a bicycle or the like. The combination appears to vary systematically in reflectance characteristics to the eye of a viewer thereof who is end-wise located before or after such a vehicle as it moves thereby increasing the discernability of such moving vehicle and its operator.

9 Claims, 18 Drawing Figures

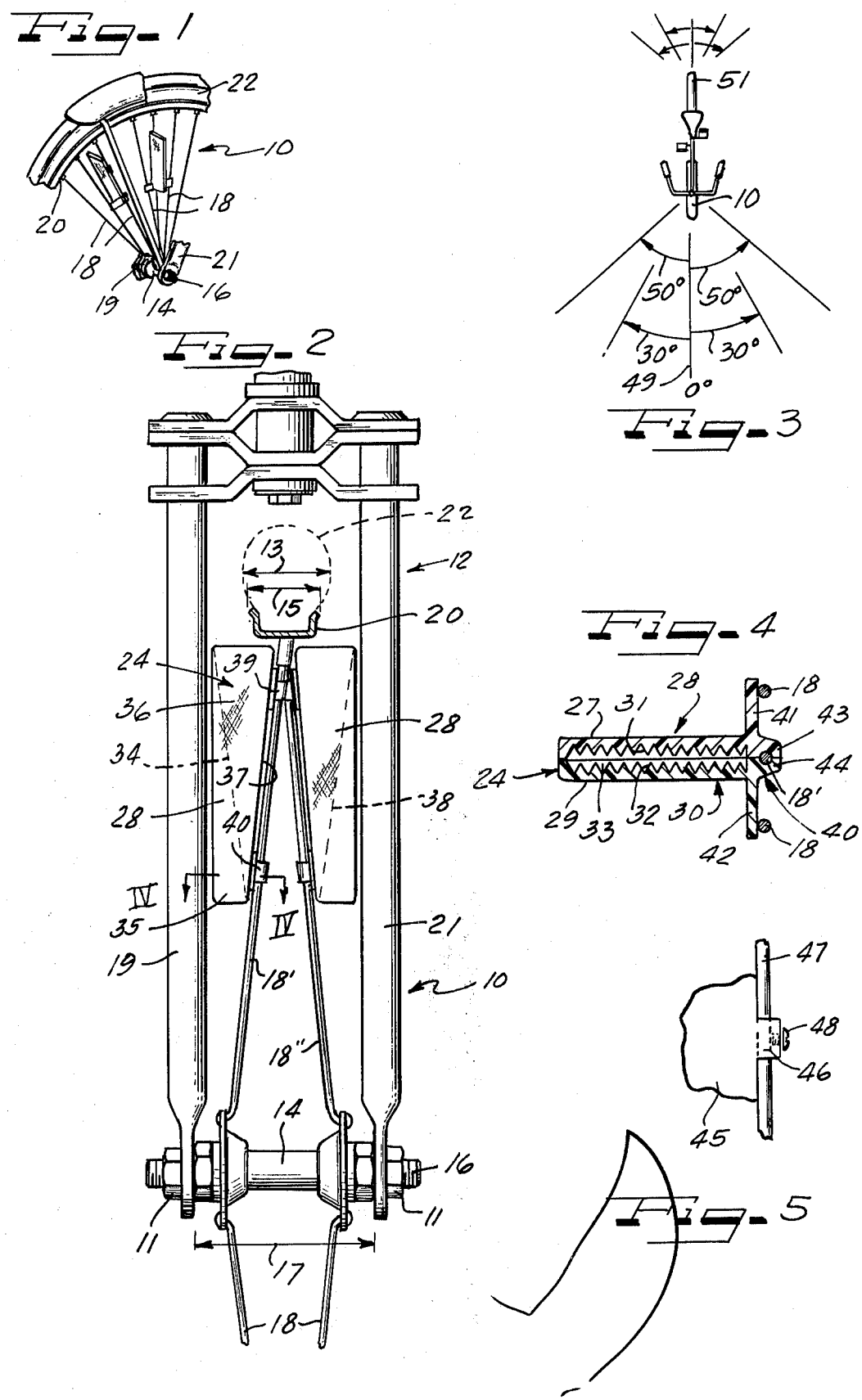

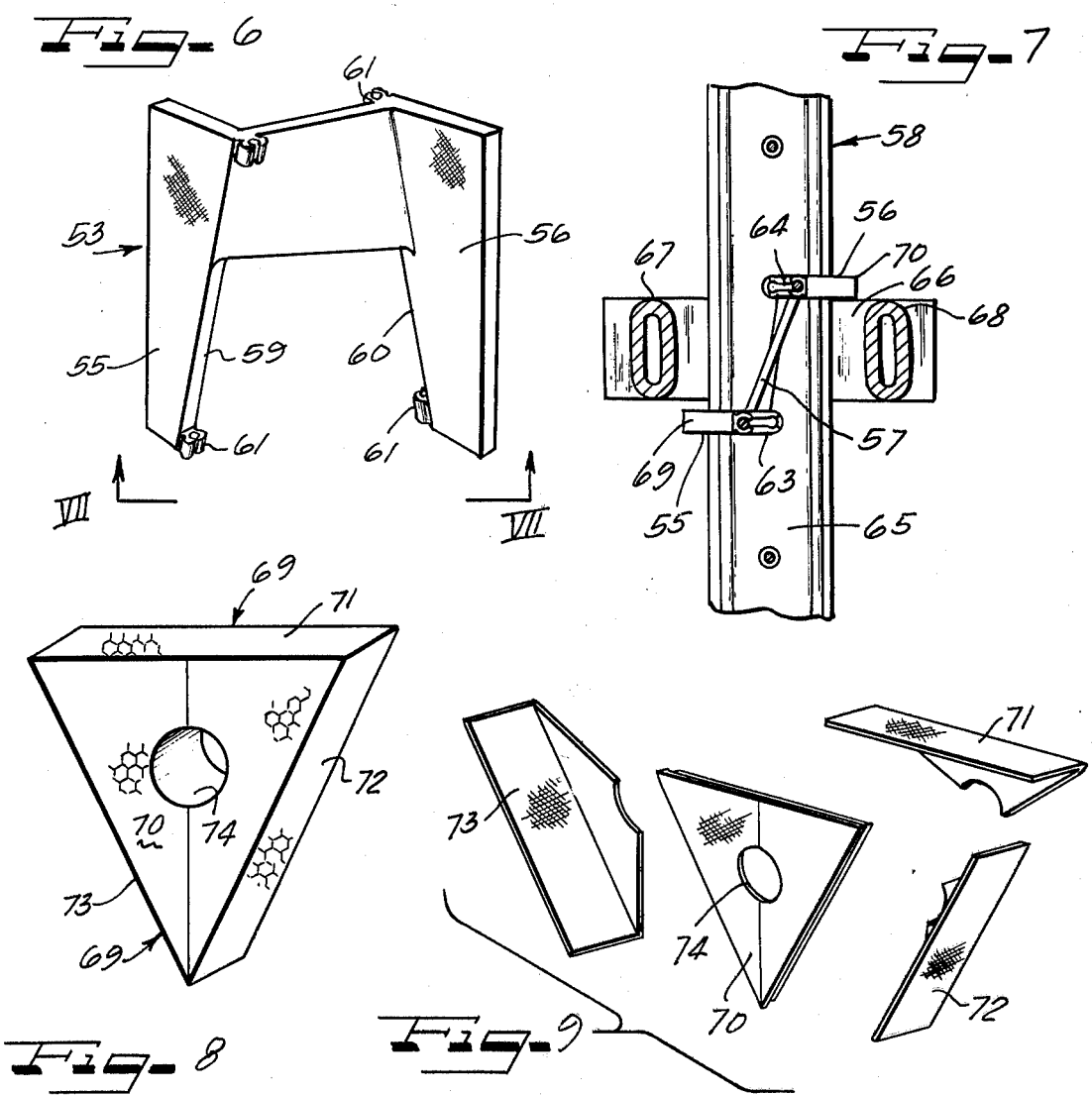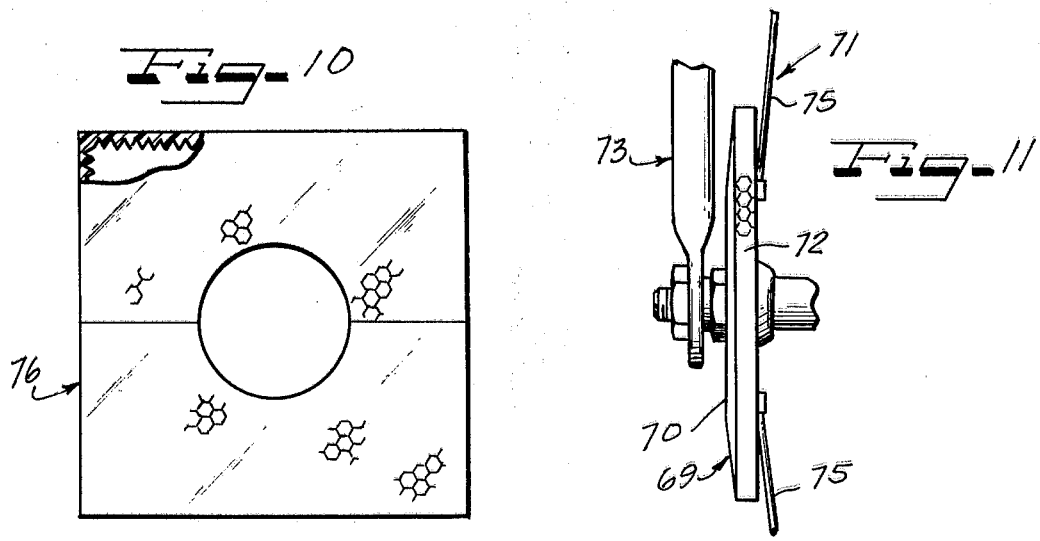

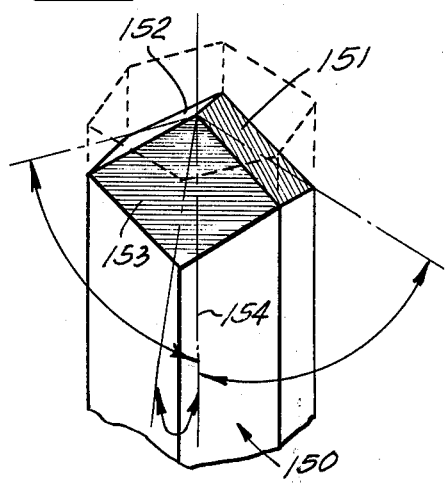
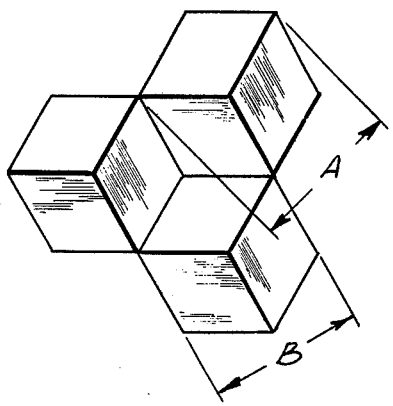
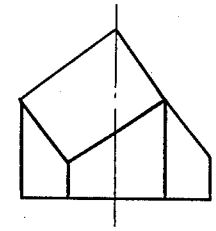
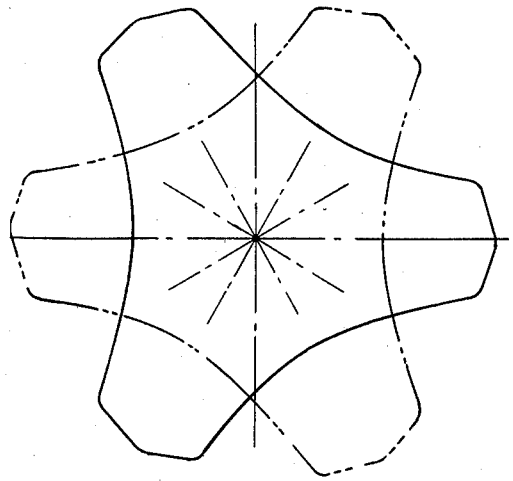
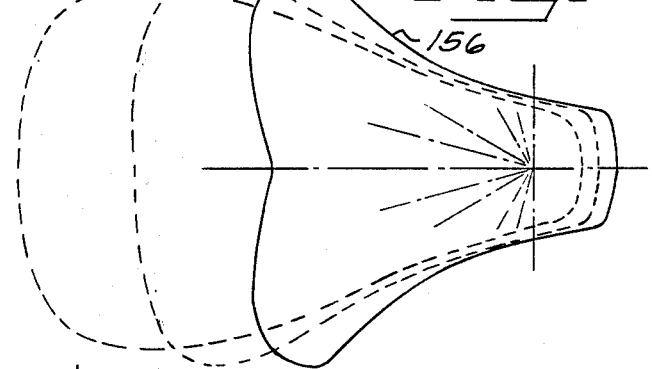
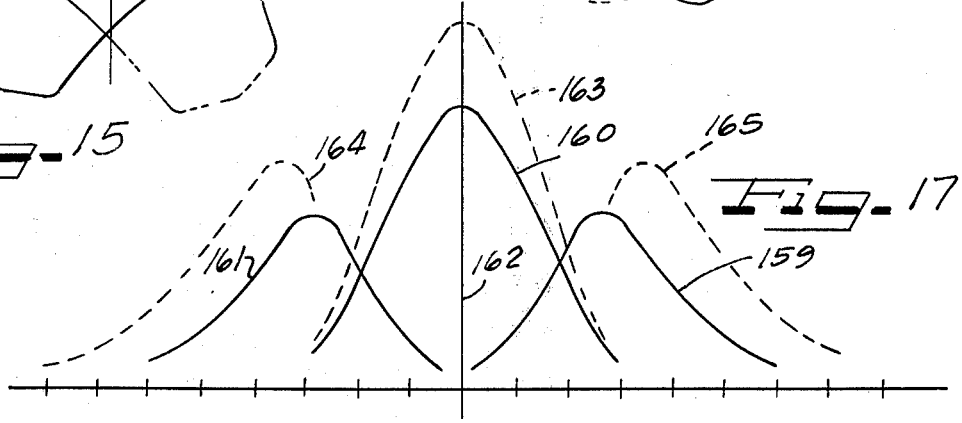
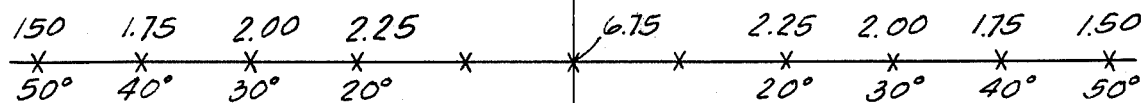

END-VIEWABLE, SPOKE-MOUNTABLE REFLECTOR

BACKGROUND OF THE INVENTION

Every year thousands of persons, notably children, are killed or injured in traffic accidents caused by the fact that drivers of motor-driven vehicles, such as automobiles, omnibuses, trucks and the like, have failed to notice cyclists and similar smaller vehicle operators moving in a parallel or opposed direction on roadways and streets under conditions of twilight or darkness. The reflectors heretofore used for end viewability on such smaller vehicles are typically mounted in a fixed position on the tail end of a rear fender on the back of the seat, between an axle retaining nut and the axle on the outside of the frame, or the like. In addition, conventional reflex reflectors have a capacity to retro-reflect incident light only within an angle of about ±30°, and, so long as the viewing angle remains generally within this range (which is typical at end locations relative to a bicycle), the amount of light reflected therefrom remains constant, thus providing a less attention getting constant source of light to attract the eye of an oncoming motorist. There is a need for an improved end viewable wheel mounted reflector system.

BRIEF SUMMARY OF THE INVENTION

This invention is directed to a wheel member having secured thereto a reflector means. The reflector means has at least one flattened retro-reflective (or reflex-reflective) surface which extends laterally outwardly on at least one side of the associated such wheel member, such surface being generally laterally parallel to the axis of such wheel member.

Preferably such surface also extends in a lengthwise direction thereof parallelly to a radius of such wheel member, though not necessarily laterally aligned with any given radius thereof. Preferably, the reflector means has at least two such flattened surfaces, each having a lengthwise extending direction thereof positioned parallelly to a radius of such wheel member, though not necessarily laterally aligned with any given radius thereof. Preferably, in a reflector means having at least two such flattened surfaces, a lengthwise end of each such surface adjoins a lengthwise end of another such surface. Preferably, each such flattened surface is generally planar exteriorly.

Preferably the wheel member is of the spoked type so that the rim portions thereof are supported in fixed symmetrical, radially spaced, circumferentially extending relationship to the hub portions thereof by a plurality of spoke means. Preferably such hub portions are axially (laterally) wider than such rim portions thereof.

The reflector means is adapted to rotate with such wheel member when such wheel member is mounted operatively and rotatably in a vehicular frame means without any substantial contact with such frame means. In addition, each such flattened surface of a reflector means is adapted to retro-reflect incident light striking thereagainst over angles generally ranging up to at least about 30° (preferably up to at least about 45°, and more preferably up to at least about 50°) measured generally normally in a transverse plane to each such surface laterally outwardly parallelly to the axis of such wheel member (or, in effect, on the outside of a hypothetical plane vertically extending normally through each such face). Further, each such flattened surface of a reflector means is preferably adapted to retro-reflect light incident thereon over angles generally ranging at least up to about 30° (optionally up to at least about 45°) measured generally normally to each such surface lengthwise perpendicularly to the axis of such wheel member. A reflector means associated with each wheel member may comprise more than a single body and each such body may comprise more than a single element or component.

The interrelationship between such wheel member and such reflector means associated therewith is such that incident light from a light source within the above indicated retro-reflective angles which strikes such a flattened surface thereof is retro-reflected only during a portion of the time required for such wheel member to be revolved on its axis through 360°. Thus, the eye of a viewer who is effectively located within a retro-reflective end region of such wheel member can see retro-reflected light from such reflector means only intermittently. Such an intermittent retro-reflectance produces a light flashing effect which is readily discernable by the average viewer and which seemingly makes the presence of such reflector means and its associated wheel member more rapidly known to such viewer than would otherwise be the case were such assembly merely to continuously reflect light incident thereon in the manner, for example, of a conventional reflector mounted fixedly on a vehicular frame.

For wheel members which rotate normally at circumferential speeds of less than about 50 m.p.h. when associated with a vehicle frame, it is preferred to have one such interruption in retro-reflected light energy for each 180° of wheel member axial revolution.

An object of this invention is to provide a combination of wheel member and reflector means whereby a variable amount of reflected light is viewable by a viewer end-wise located with respect to such wheel member.

Another object is to provide end viewable reflector means for cooperative association with a wheel to produce during revolutions of such wheel variations in reflected light from such reflector means, thereby attracting the eye of a viewer more readily than a directionally stable, reflex reflex reflector mounted on a vehicle, such as a bicycle, as such vehicle moves.

Another object is to provide an improved apparatus and method for safety purposes in the operation of vehicles which provides a flashing effect at either end region of a moving vehicle relative to the eye(s) of an end-wide located viewer (who may be stationary or in motion).

Other and further objects, purposes, advantages, aims, utilities, and features will be apparent to those skilled in the art from a reading of the present specification and drawings.

BRIEF DESCRIPTION OF THE DRAWINGS

In the drawings:

FIG. 1 is a fragmentary perspective view of a bicycle wheel and its associated bicycle frame, such wheel being equipped with reflectors in accordance with the teachings of this invention;

FIG. 2 is a fragmentary vertical sectional view through one embodiment of an assembly of a bicycle frame member having mounted therein a spoked wheel member, such wheel member being equipped with reflector means in accordance with the teachings of the present invention;

FIG. 3 is a top plan view in diagrammatic form of a bicycle equipped with the assembly of FIG. 2 and illustrating the retro-reflective angles as shown in FIG. 2, relative to a person located in a frontal position relative to the bicycle;

FIG. 4 is a cross sectional view taken generally along the line IV—IV of FIG. 2 illustrating the construction of the reflector shown in FIG. 2;

FIG. 5 is a fragmentary view in side elevation showing an alternate means for clamping a reflector of the type illustrated in FIG. 4 to a spoke member in a wheel means as illustrated in FIG. 2;

FIG. 6 is a perspective view of one embodiment of an alternative embodiment of the reflector bodies illustrated in FIG. 2 wherein the two separate reflector bodies of FIG. 2 are combined into a single, one piece construction;

FIG. 7 is a top plan view of the embodiment shown in FIG. 6, but illustrating such embodiment mounted in a bicycle wheel member of the type generally illustrated in FIG. 2;

FIG. 8 is a perspective view of one embodiment of a hub engaging reflector body suitable for use in the practice of the present invention;

FIG. 9 is an exploded view of the reflector shown in FIG. 8;

FIG. 10 is another embodiment of a hub mounted reflector body suitable for use in the present invention;

FIG. 11 is a fragmentary side elevational view showing a reflector of FIG. 8 mounted operationally on the hub portion of a mounted wheel member of the type shown in FIG. 2;

FIG. 12 is an enlarged isometric view of one embodiment of a pin;

FIG. 13 is a top plan view of the hexagonal pattern produced by a plurality of pins in a retro-reflective reflector;

FIG. 14 is a side elevational view of one cube corner in a retro-reflective reflector body;

FIG. 15 is a plot of the characteristic retro-reflected light intensity produced by a plurality of facets of the type shown in FIG. 14;

FIG. 16 is a series of plots illustrating the manner in which the field of reflected light changes as the pin centers are angled from a vertical position to a position inclined to the vertical;

FIG. 17 shows illustrative plots for a reflector of the type having both standard reflector facets and wide angle reflector facets; and FIG. 18 is a plot illustrating the relationship between angle of reflected light and intensity of reflected light at such angle both horizontally and vertically for a combination of wide angle and standard reflectors in a single reflector body.

DETAILED DESCRIPTION

In FIGS. 1 and 2, a portion of a bicycle wheel 10 is shown mounted for rotation in a front fork member 12 of a conventional bicycle frame (not detailed). The wheel 10 is provided with a hub 14 which is rotatably mounted on a fixed axle 16 secured conventionally between the opposed ends of the arms 19 and 21 of the fork member 12 with bolts 11. The hub 14 is conventionally connected by means of a plurality of spokes 18 to a rim member 20 in circumferentially spaced relationship thereto. A tire 22 is conventionally mounted on the rim 20, as indicated by dotted lines in FIG. 2. The width 13 of tire 22 and the width 15 of rim 20 are each considerably less than the width 17 of hub 14.

On one of the spokes 18' there is secured a reflector 24 which is generally rectangular in cross section and has an outer or outside longitudinally extending edge 26 which is adapted to be in spaced, parallel relationship to an arm 19 of fork 12 as the wheel 10 rotates.

On another spoke 18'' on the opposite side of wheel 10 and nearly aligned with the spoke 18' is secured a second reflector 38. The reflector 38 is constructed in the same manner as the reflector 24 except that reflector 38 is adapted to retro-reflect incident light from the right side of wheel 10 in FIG. 2, while reflector 24 retro-reflects incident light from the left side.

Referring for example to FIGS. 1 and 2, reflector 24 is seen to comprise a plastic body comprised of two transparent members 28 and 30, each member 28 and 30 having a flat, smooth outer side surface 27 and 29, respectively, and a recessed inner side surface 31 and 32, respectively. The members 28 and 30 are permanently joined together along their respective edge portions by an adhesive (not shown), by sonic welding, or by like fastening means, so as to form between the recessed surfaces thereof an enclosed, hollow space 33.

The inner side surfaces 31 and 32 of the members 28 and 30, respectively, have molded thereinto prismatic reflective surfaces, each surface being typically hexagonally or diamond shaped (not drawn to scale herein), so that incident light striking the corresponding sides 27 and 29 is retro-reflected from side surfaces 31 and 32, all conventionally.

In the reflector 24, each inner side surface 31 and 32 is adapted to reflect incident light from the left in FIG. 2 retro-reflectively over an angle ranging from about 0° to at least about 45° measured generally normally to a radius of wheel 10, as illustrated in FIG. 3, on the left side thereof (see especially FIG. 3). The 0° angle is here the center line 49 of the bicycle 51. To achieve such an angle of retro-reflection, each inner side surface 31 and 32 of reflector 24 is divided into two portions, as suggested by dotted line 34 in FIG. 2. Portion 35 forms a reflective surface adapted to retro-reflect incident light from a side direction in a conventional manner up to about 30°, while portion 36 is similarly adapted to retro-reflect light but within an angle ranging from about 20 to at least about 45° inclusive. The portion 35 is sometimes being known to those skilled in the art as a "standard" reflector, while the portion 36 is sometimes known to those skilled in the art as a "wide-angle" reflector. Wide variations in the properties of standard and "wide-angle" reflectors are possible, depending upon such variables as retro-reflectance area, pin angles (pins being the term used in the art to designate the individual polygonally shaped bodies used to form the inside face for making an electroform in which a reflector body is molded) and the like, as those skilled in the art will readily appreciate. In general, a reflector 24 need only have standard reflective surfaces for achieving flashing of retro-reflected light in accord with the teachings of the present invention. A reflector 24 can conveniently be formed of molded plastic portions 35 and 36, such as of acrylic resin or the like.

For purposes of the present invention a standard reflective surface can be regarded as comprised of a group of retro-reflective prismatic facets. Each facet is adapted to retro-reflect incident light at an angle ranging from about 0° up to about ± 30° measured normally thereto in one direction within one plane all facets of a group being aligned for similar reflective properties.

Those skilled in the art will appreciate that any reflective surface of the type employed in the present invention can have a plurality of such planes, each one parallel to the other, no one plane is critical. One plane is simply used as a reference position for convenience.

Similarly, for purposes of the present invention, wide angle reflective surface can be regarded as comprised of a group of retro-reflective prismatic facets.

As those skilled in the art will appreciate, one could employ in the practice of the present invention a reflector body such as reflector 24 which is incorporated thereinto two different types of retro-reflective prismatic facets. Each such type of facet is arranged into at least one group, each such group being comprised of a plurality of such facets. One such group is adapted to retro-reflect incident light striking such at an angle ranging from about 0° up to about ± 30° measured normally thereto in one plane.

The other such group is adapted to retro-reflect incident light striking such at an angle ranging from an angle which is not greater than the maximum retroreflectance angle of said one group up to an angle which is at least about ± 45° measured normally thereto in such plane.

A preferred class of standard reflective surfaces for use in this invention, and a preferred class of wide angle reflective surfaces for use in this invention are each also generally adapted to retro-reflect incident light striking a reflective surface of either such class at an angle ranging from about 0° up to ± 30° measured normally thereto in another direction which is perpendicular to said one direction in such one plane. Said one direction extends horizontally and said other direction extends vertically.

In a particular reflective body, such as reflector 24, adapted for use in the practice of this invention, such one horizontal direction usually extends mainly in one direction only from a center line therein of some sort so as to adapt such body primarily for side viewability from either a left or a right side, depending on which side of a wheel member such body is to be mounted, as those skilled in the art will appreciate. Such center line is normally perpendicular to the center line of the axis of such wheel member.

Also, in a particular reflective body, such as reflector 24, adapted for use in the practice of this invention, the relative size of the standard reflective surface, and also of the wide angle reflective surface, if the latter is present, such as portions 35 and 36, is a matter of choice, but preferably each is as large as practical, and, when a given body contains both standard and wide angle reflective surfaces, each may be about equal to the other in retro-reflective light intensity characteristics.

To secure reflector 24 to wheel 10, spoke mounting means is provided. Here, the reflector 24 is equipped with a pair of radially spaced brackets 39 and 40 on its inner edge 37. Each bracket 39 and 40 is similarly constructed. Thus, referring for example to bracket 40, there is seen a pair of circumferentially outwardly extending arms 41 and 42 normally projecting outwardly and sidewards one from each respective members 28 and 30. The length of each arm 41 and 42 is such as to permit each arm 41 and 42 to engage the side surface of an adjacent spoke member 18 (see FIG. 4). The central portion 43 of each bracket 39 and 40 is thickened and comprised of a pair of jaws which meet at a radially-aligned mid-line 44 and have a central cavity adapted to receive therein a spoke 18'. The reflector 24 is engaged with spoke 18' by pressuring radially a spoke 18' against the thickened portion 43 until a snap fit through line 44 is achieved and the spoke member 18' lodges in the thickened portion 43 with the respective arms 41 and 42 abutting against the adjacent spoke members 18.

An alternative technique for mounting reflectors of the type such as reflector 24 upon the spokes 18 of wheel 10 is illustrated in FIG. 5. Here a portion of a side surface of a reflector 45 is provided with a pair of spaced, parallel, projecting tabs 46 (only one shown) which are adapted to receive therebetween a spoke member 47. Partial threads formed between the tabs 46 on facing surfaces thereof are adapted to receive a set screw 48 which when tightened secures the reflector 45 to the spoke 47. Those skilled in the art will appreciate that any convenient fastening means may be employed to secure a spoke mountable, end viewable reflector to spoke members 18 of a wheel 10, or the like.

Any convenient technique may be employed to fabricate reflectors 24 and 38, and such can have any convenient perimetric shape provided no interference with normal wheel operation occurs, as those skilled in the art will appreciate.

In FIG. 6 and 7, there is illustrated diagrammatically a modified construction for a reflector assembly 53 suitable for spoke mounting in accordance with the practice of the present invention. Here, a pair of reflectors 55 and 56 are interconnected together integrally by a structural member 57 so that the reflectors 55 and 56 are somewhat angularly displaced from one another, but are each generally radially aligned with, and adapted to laterally project from respective opposite sides of a wheel member 58. Along the inside edge 59 and 60 of each respective reflector 55 and 56, respectively, and integrally formed therewith, are clamps 61, there being two clamps 61 for side edge 59 and two for side edge 60, respectively. Each clamp 66 has longitudinally split construction similar to bracket 40 and is adapted to be snapped over a spoke. Thus, referring, for example, to FIG. 7, there is seen a reflector assembly 53 mounted over spokes 63 and 64 by clamps 61; the reflector 55 is mounted adjacent a spoke 63 and a reflector 56 is mounted adjacent a spoke 64, the spokes 63 and 64 being secured at their respective outer end portions to the rim 65 of the wheel 58 conventionally. The vehicle fork member 66 carrying the wheel 58 has its respective arms 67 and 68 in spaced relationship to the outer edge portions 69 and 70 of each reflector 55 and 56, respectively, when the reflector assembly 53 is assembled onto the spokes 68 and 70, as illustrated in FIG. 7.

In place of using a spoke mounted reflector or reflector assembly as shown in FIGS. 1 through 7, one may employ a reflector assembly which is hub mounted, or which uses some combination of rim, or hub, and/or spoke mounting, provided the reflector faces are adapted and oriented to achieve the type of characteristic reflection between 0° and at least about ± 30° as hereinabove indicated. Thus, for example, there is shown in FIGS. 8, 9 and 11 one embodiment of a hub mountable reflector arrangement. This reflector, which is herein designated in its entirety by the numeral 69, comprises side viewable component 70 (which is nonfunctional so far as the present is concerned) and three edge components in a triangular configuration about the sides of component 69, these edge components being designated 71, 72 and 73. These edge components 71, 72 and 73 are disposed normally to, and are adhered, as by an adhesive, side component 70. The reflector 69 is thus preferably and conveniently formed of four separately molded transparent elements (edge components 71, 72 and 73 and side component 70) which are glued or sonically welded together, as those skilled in the art will appreciate. Each edge component 71, 72 and 73 has an inner flanged portion adapted to define an inner mouth of a channel 74. Each edge component 71, 72 and 73 has an outside foci which is adapted to retro-reflect light over an included angle over about 0° to at least about 45° (about 0° to at least about 50° being preferred) from these edges towards side 70 and, for this reason, each edge 71, 72 and 73 is equipped with two reflective surfaces (a standard surface and a wide angle surface) in the manner of the surfaces of reflector 24 above.

In the center of the side 70 is the opening of a channel 74 adapted to receive the hub portion 72 of a spoked wheel 71 (see FIG. 11), so that a reflector 69 can mount over hub 72 and still leave wheel 71 rotatable relative to frame 73 of a bicycle (not detailed), the reflector 69 being outside hub 72 and over the end portions of spokes 75 of wheel 71. The wheel 71 preferably is equipped with a pair of such reflectors 69 in opposed relationship to each other at opposite ends of hub 72 to achieve equally viewable retro-reflective angles about the front or rear of such bicycle, as those skilled in the art will appreciate.

Another but alternative embodiment of such a hub mounted reflector is shown in FIG. 10 and is designed in its entirety by the numeral 76. Reflector 76 has four sides and is formed of four molded, transparent elements analogously to reflector 69.

Preferably, each individual, integral reflector body used in the practice of this invention is so constructed as to include both a standard reflector element and a wide angle reflector element integrally formed in the same such body. Preferably, the standard element (or elements) in such body is adapted to be disposed on an outside portion of such a reflector body's reflective surface(s) as such body is mounted on a wheel in a cycle, while the so-called wide angle element (or elements) is such body is adapted to be disposed interiorly thereof. Such an arrangement of reflector elements aids end viewability and tends to minimize a shadowing effect caused by the presence of rim and tire members in a revolving wheel member on a cycle (including bicycles, tricycles, motor cycles, and the like).

Preferably, when an end-viewable reflector body is spoke mountable, it radially extends between hub and rim portions of a wheel member. Preferably such a reflector body is of a hollow, cross ectionally rectangular shape, and is elongated and flattened. Preferably also, such a body has a width which is maximized to utilize all possible space between the spoke portions of the associated wheel member and the adjacent cycle frame portions in an operating cycle. Preferably also, such a body is so constructed that, when it is mounted on wheel spokes, the means used for mounting substantially prevent the reflector from pivoting about an axis formed between a spoke member and such a reflector body adjacent thereto. Preferably also, such a body has opposed faces which are each retro-reflectively reflective so that, as a wheel equipped therewith revolves, one face thereof reflects light to an end wise (relative to the cycle holding the wheel) located viewer during 90° of wheel rotation, while the reverse or opposed face of such body reflects light to such viewer during the succeeding 90° of rotation constituting a 180° period of rotation (assuming viewability during 180° of rotation).

In the case of a hub mounted end-viewable reflector member, such member preferably has at least three end edge interconnecting retro-reflective reflective surfaces. These faces are preferably each about 120° apart. The side face of such a hub mounted reflector can include any desired combination of reflector elements, as those skilled in the art will appreciate.

At circumferential speeds higher than about 50 m.p.h., the variations in retro-reflected light intensity apparently can seem to occur sufficiently rapidly to make successive flashes of reflected light occurring in a reflectorized wheel of this invention as the wheel revolves appear to take on a more nearly steady appearance, owing apparently to the limited ability of a human eye to detect variations in light and variations in intensity thereof. Viewability once every 360° of such an end mounted wheel reflector is then convenient. Similarly, cycle speeds greater than about 3 to 4 m.p.h. are preferred in order to produce a readily discernable flashing effect as respects a human eye. Those skilled in the art will appreciate that cycle end-viewable hub mounted reflectors, spoke mounted reflectors, rim mounted reflectors, and combinations thereof, for purposes of the present invention, are preferably adapted for use with a particular size and type of cycle, owing to the close tolerances which can occur between a wheel member and a frame member, so that a maximum end viewability in reflectance area may be achieved in a given reflector.

Both a front wheel and a rear wheel of a two wheeled cycle are preferably equipped with end-viewable reflectors in accordance with the teachings of the present invention. Even when an end-viewable reflector is employed on a rear cycle wheel whose associated frame member is equipped with a fender member, it will be appreciated that such reflector is still end viewable from a rearward position since the end-viewable reflector moves beneath the fender during each wheel revolution. Such a rear end-viewable reflector seems to be particularly thus noticeable when distances greater than about 20 or 30 feet are involved between the eyes of a viewer and the back end of a so-equipped cycle.

The interrelationship between a group of facets in a retro-reflective reflector which is adapted to retroreflect at an angle of ± 30° in one direction compared to a group of facets in such reflector adapted to retroreflect at a side angle of up to about ± 45° is illustrated by FIGS. 12 through 18. In the manufacture of retroreflective reflectors of the type used in the present invention a plurality of so-called pins 150 may be employed. Each pin, as shown here, is hexagonally shaped. The transverse distance B between flat sides is variable, but is typically of the order of about 0.094 inches, while distance A between opposing edges is similarly variable, but is typically about 0.108 inches. Three intersection facets 151, 152 and 153 are formed at the forward end of each pin 150. Each facet 151, 152 and 153 traverses two sides of the hexagonal pin and has an apex coinciding with the axis 154 of each pin 150. Each facet has an angle relative to the axis of about 35¼°.

The pins are arranged into a pattern such as shown in FIG. 13 and an electroform mold or the like is made using such pin pattern, the electroform being concurrently made by electroplating nickel or the like onto and over a plurality of aligned pin 151 heads. In such process the high points are reversed in mirror image fashion in the product mold (over the former low points in the pins) and vice versa, all as those skilled in the art will appreciate. From the product mold, a reflector element is molded. A section of the resulting reflector is shown in FIG. 14.

When a reflector body having a plurality of individual facets such as shown in FIG. 14 is caused to retroreflect incident light, a characteristic pattern of reflected light results, such as illustrated in FIG. 15 in solid line form by an isocandle per foot candle curve in polar coordinates. When the facets of FIG. 13 are rotated through 180° there is produced a similar characteristic pattern as shown by the dotted line in FIG. 15.

However, when one tilts the axis 154 of each of a plurality of pins 151 arranged in a pattern such as shown in FIG. 13 from the vertical position shown in FIGS. 12–14, through increasing angles of common inclination, there is produced a changing family of characteristic patterns of reflected light such as shown in FIG. 16, each succeeding plot 156, 157, 158 representing an isocandle per foot candle curve in polar coordinates, each curve representing a greater inclination angle for a group of pins, which are electroformed into a mold, and then the mold used to make a reflector body. The plots of FIGS. 15 and 16 are not for any specific reflectors, but only are given herein to illustrate the principles involved, which are known already to those skilled in the art.

When one tilts the axes 154 of such a plurality of such pins 151 in the opposite direction, then is produced a changing family of characteristic curves like those in FIG. 16, but reversed.

When one combines into a single reflector body both the type of composite reflex reflectance shown in FIG. 15 with the type shown in FIG. 16, and, in addition uses two standard sections such as shown in FIG. 15 but with each section oriented 180° with respect to the other, there is produced in a single reflector body both such types of reflex reflectance, that shown in FIG. 15 sometimes being known as a standard reflector having a characteristic reflectance value generally given as ± 30°, that shown in FIG. 16 sometimes being known as a wide angle reflector having a characteristic reflectance value which can range very widely from about 10° to 88°, though values between about 25° and 70° are particularly and preferably useful. Such a combination reflector body displays a plot of retro-reflectance angle versus reflected light intensity as shown in FIG. 17, lines 159, 160 and 161. Line 160 is produced by the so-called standard retro-reflective facets, line 159 is produced by the so-called wide angle retro-reflective facets sensitive to light on the right side of the ordinate 162, and line 161 is produced by the so-called wide angle retro-reflective facets sensitive to light on the left side of the ordinate 162.

If, for example, the number of standard facets is increased, the amount of reflected light increases (see dotted line 163). If, for example, both the number of wide angle facets and their respective angles of inclination are increased for both right and left hand members, the dotted lines 164 and 165 result. U.S. Government federal standards for a bicycle reflector comprising such a combination of left and right wide angle reflector groups in combination with a centrally viewable standard reflector are shown in the illustrative plot of FIG. 18. By combining different pin groupings at different respective facet axis angles one can produce an unlimited gradation of retro-reflectance characteristics in a given retro-reflector, so that any given reflector can be produced by one skilled in the art within the limitations of pins, materials of construction, design standards, and the like, using known technology.

Other and further embodiments and variations of the present invention will become apparent to those skilled in the art from a reading of the present specification taken together with the drawings and no undue limitations are to be inferred or implied from the present disclosure.

I claim:

1. An assembly for producing a light flashing effect comprising in combination
   A. a rotatable wheel member having a wheel axis, and a center plane generally perpendicular to said wheel axis,
   B. a reflector unit having at least one region comprised of transparent solid material and having a region axis normal thereto, said region having formed therein at least two groups of cube corner reflector elements, all such elements each having a central optical axis, the respective such optical axes of such elements in each such group being disposed substantially parallel to the respective such optical axes of the other such elements in each such group, the respective optical axes of such elements in one such group being generally parallel to said region axis, the respective optical axes of such elements in a second such group being inclined at a predetermined angle relative to said region axis, said region being retro-reflective of light directed thereon over an angle extending from at least about 45° on one side of said region axis to at least about 30° on an opposed side of said region axis measured in a measurement plane containing said region axis and said predetermined angle,
   C. said reflector unit being adapted for functional association with a side portion of said wheel member so that said region axis is generally perpendicular to said wheel axis, and
   D. mounting means to mount said reflector unit fixedly to said wheel member in such association,
   E. said wheel member, said reflector unit and said mounting means coacting together so that, when said wheel member is rotated, said reflector unit is adapted to produce a flashing light signal viewable at any spatial position relatively remote from said assembly within a viewing angle extending from not less than said center plane to at least about 45° on one side of said center plane once during each 360° of rotation of said wheel member.

2. The assembly of claim 1 wherein said region axis extends generally parallel to one radius of such wheel member.

3. The assembly of claim 1 wherein there are at least two such reflector units, each such two reflector units being so associated with side portions of said wheel member, said wheel member, said reflector units and said mounting means coacting together so that, when said wheel member is rotated, said two reflector units together being adapted to produce flashing light signals viewable at any spatial position relatively remote from said assembly within a viewing angle extending from at least about 45° to one side of said center plane to at least about 45° to the opposite side of said center plane once during each such 360° of rotation.

4. The assembly of claim 1 wherein there are at least two such reflector units, each such two reflector units being associated with one another in a back-to-back relationship so that the respective region axes of such reflector units are generally parallel to each other when each such reflector unit is so associated with such side portions, said wheel member, said reflector units, and said mounting means coacting together so that, when said wheel member is rotated, said two reflector units each being adapted to produce flashing light signals viewable at any spatial position relatively remote from said assembly within a viewing angle extending from not less than said center plane to at least about 45° on one side of said center plane twice during each such 360° of rotation.

5. The assembly of claim 1 wherein said region axis extends generally normally to one radius of such wheel member.

6. The assembly of claim 1 wherein said wheel member is spoked.

7. An assembly for producing a light flashing effect comprising in combination
   A. a rotatable wheel member having a rim portion, a wheel axis, and a center plane generally perpendicular to said axis,
   B. two reflector units each one having at least one region comprised of transparent solid material and having a region axis normal thereto, said reflector units being generally in adjacent, back-to-back relationship to one another so that said respective region axes are generally parallel to one another, each said one region having formed therein at least one group of cube corner reflector elements, all such elements each having a central optical axis, the respective such optical axes of such elements in each such one group being both disposed substantially parallel to the respective such optical axes of the other such elements in each such one group, and parallel to the said region axis of the associated said one region, each said one region being retroreflective of light directed thereon at least over an angle of from about 0° to 30° relative to that one region's said region axis in a zone arranged generally about said one region's region axis,
   C. mounting means to mount each one of said reflector units fixedly to said wheel member with each respective region axes generally normal to one radius of said wheel member.
   D. said wheel member, said reflector units and said mounting means coacting together so that, when said wheel is rotated, each of said reflector units is adapted to retro-reflect light intermittently so as to produce a pair of flashing light signals each viewable alternately with respect to the other and each viewable at a different respective location in spaced relation to the other, one such location being above the other thereof, within a viewing angle up to at least about 30° to one side of said center plane once during each 360° of wheel rotation.

8. The assembly of claim 7 wherein said two reflector units are fastened to one another and are adjacent said rim portion.

9. The assembly of claim 4 wherein each respective said region axis extends normally to one radius of such wheel member and wherein said wheel member, said reflector units and said mounting means coacting together so that, when said wheel is rotated, each of said reflector units is adapted to retro-reflect light intermittently so as to produce a pair of flashing light signals each viewable alternately with respect to the other and each viewable at a different respective location in spaced relation to the other, one such location being above the other thereof, within a viewing angle up to at least about 30° to one side of said center plane once during each 360° of wheel rotation.

* * * * *